US008917636B2

(12) United States Patent
Giese et al.

(10) Patent No.: US 8,917,636 B2
(45) Date of Patent: Dec. 23, 2014

(54) TRANSMITTER CIRCUIT AND METHOD (75) Inventors: Tilman Giese, Munich (DE); Juergen Kreuchauf, San Francisco, CA (US); Bernd Schiele, Duesseldorf (DE); Tobias Scholand, Muelheim (DE); Alberto Perez, San Jose, CA (US); Ulrich Mennchen, Poing (DE); Ralf Itjeshorst, Walpertskirchen (DE)

(73) Assignee: Intel Mobile Communications GmbH, Neubiberg (DE)

( * ) Notice: Subject to any disclaimer, the term of this patent is extended or adjusted under 35 U.S.C. 154(b) by 371 days.

(21) Appl. No.: 13/173,488

(22) Filed: Jun. 30, 2011

(65) Prior Publication Data

US 2013/0003570 A1    Jan. 3, 2013

(51) Int. Cl.
| H04B 7/00  | (2006.01) |
| H04W 52/36 | (2009.01) |
| H04W 52/38 | (2009.01) |
| H04W 52/14 | (2009.01) |
| H04W 52/28 | (2009.01) |

(52) U.S. Cl.
CPC .......... *H04W 52/367* (2013.01); *H04W 52/386* (2013.01); *H04W 52/143* (2013.01); *H04W 52/146* (2013.01); *H04W 52/281* (2013.01)
USPC ......................................... 370/277; 370/328

(58) Field of Classification Search
CPC .................................................. H04W 52/386
USPC .................................................. 370/328, 277
See application file for complete search history.

(56) References Cited

U.S. PATENT DOCUMENTS

| 6,917,599 | B2* | 7/2005  | Kono ............................. 370/320 |
| 7,058,421 | B2* | 6/2006  | Ngai et al. .................... 455/522 |
| 7,242,954 | B2* | 7/2007  | Lehtinen et al. .............. 455/522 |
| 8,094,682 | B2* | 1/2012  | Pani et al. ...................... 370/474 |
| 8,265,016 | B2* | 9/2012  | Xu ................................... 370/329 |
| 8,416,678 | B2* | 4/2013  | Yi et al. .......................... 370/216 |
| 8,812,040 | B2* | 8/2014  | Liu et al. ......................... 455/509 |
| 2003/0224813 | A1* | 12/2003 | Lehtinen et al. .............. 455/513 |
| 2005/0163070 | A1* | 7/2005  | Farnham et al. .............. 370/328 |
| 2006/0062193 | A1  | 3/2006  | Choi et al. |
| 2006/0128412 | A1* | 6/2006  | Mantha et al. ................ 455/522 |
| 2009/0117932 | A1* | 5/2009  | Murata ........................ 455/522 |
| 2010/0098011 | A1* | 4/2010  | Pelletier et al. .............. 370/329 |
| 2010/0309788 | A1* | 12/2010 | Ho et al. ........................ 370/236 |
| 2012/0083264 | A1* | 4/2012  | Ramasamy et al. .......... 455/425 |
| 2012/0309445 | A1  | 12/2012 | Tsui et al. |
| 2012/0329410 | A1* | 12/2012 | Balakrishnan et al. .... 455/127.1 |

OTHER PUBLICATIONS

3GPP TS 25.331 Chapters 6.3, 8.6.5.2, and 8.6.6.8. 6 Pages.
3GPP TS 25.321. Chapter 11.4. 2 Pages.
3GPP TS 25.322. Chapters 11.1, 11.2, and 11.3. 13 Pages.

* cited by examiner

*Primary Examiner* — Ricky Ngo
*Assistant Examiner* — Dewanda Samuel
(74) *Attorney, Agent, or Firm* — Eschweiler & Associates, LLC (57) ABSTRACT

A transmitter circuit includes a first unit configured to determine a transmission power of the transmitter circuit, and a second unit configured to determine whether a transmission of data for a signaling radio bearer is scheduled by the transmitter circuit. The transmitter circuit further includes a third unit configured to suppress a transmission of transmission data by the transmitter circuit if the transmission power exceeds a threshold value and if the transmission of data for the signaling radio bearer is scheduled.

19 Claims, 4 Drawing Sheets

TRANSMITTER CIRCUIT AND METHOD

FIELD

The invention relates to mobile communications. In particular, the invention relates to a transmitter circuit and a method performed by a transmitter circuit.

BACKGROUND

During an operation of a transmitter circuit, transmission power and data rates may vary. Data and acknowledgment of such data may be transmitted between a transmitter circuit and further components of a radio communications system.

Transmitter circuits constantly have to be improved, for example with regard to their performance and transmission quality. In particular, it is desirable to improve the stability of a data transmission between transmitter circuits and further components of a radio communications system. For these and further reasons there is a need for the present invention.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION OF THE INVENTION

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application.

Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal. As employed in this specification, the terms "coupled", "electrically coupled", "connected" or "electrically connected" are not meant to mean that elements must be directly coupled or connected together. Intervening elements may be provided between the "coupled", "electrically coupled", "connected" or "electrically connected" elements.

The devices and methods described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" are often used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

The above mentioned standards are, inter alia, described in various documents provided by the "3rd Generation Partnership Project" (3GPP) organization. In particular, the contents of the documents 3GPP TS 25.321 V10.1.0 (2010-12); Technical Specification Group Radio Access Network; Medium Access Control (MAC) protocol specification (Release 10) and 3GPP TS 25.322 V10.0.0 (2010-12); Technical Specification Group Radio Access Network; Radio Link Control (RLC) protocol specification (Release 10) and 3GPP TS 25.331 V10.2.0 (2010-12); Technical Specification Group Radio Access Network; Radio Resource Control (RRC); Protocol specification (Release 10) are included herein by reference.

In radio communications systems, a transmitter transmitting one or more radio communications signals via one or more radio communications channels may be present. The transmitter may be a base station or a transmitting device included in a user's device, such as a mobile radio transceiver, a handheld radio device or any similar device. In particular, a transmitter may include a transmitter circuit as described herein. According to the UMTS standard, a transmitter or base station may also be referred to as "Node B". Radio communications signals transmitted by transmitters may be received by receivers such as a receiving device in a mobile radio transceiver, a handheld radio device or any similar device. In particular, radio communications systems as described herein may include UMTS systems which may conform to the 3GPP standard for UMTS systems. According to the UMTS standard, a receiver or mobile station may also be referred to as "User Equipment" (UE). Radio communications signals as described herein may be provided in UMTS systems, in particular over radio communications physical channels, such as primary common pilot channels, secondary common pilot channels, dedicated physical channels, dedicated physical control channels or similar channels according to the UMTS standard.

Figure 1:
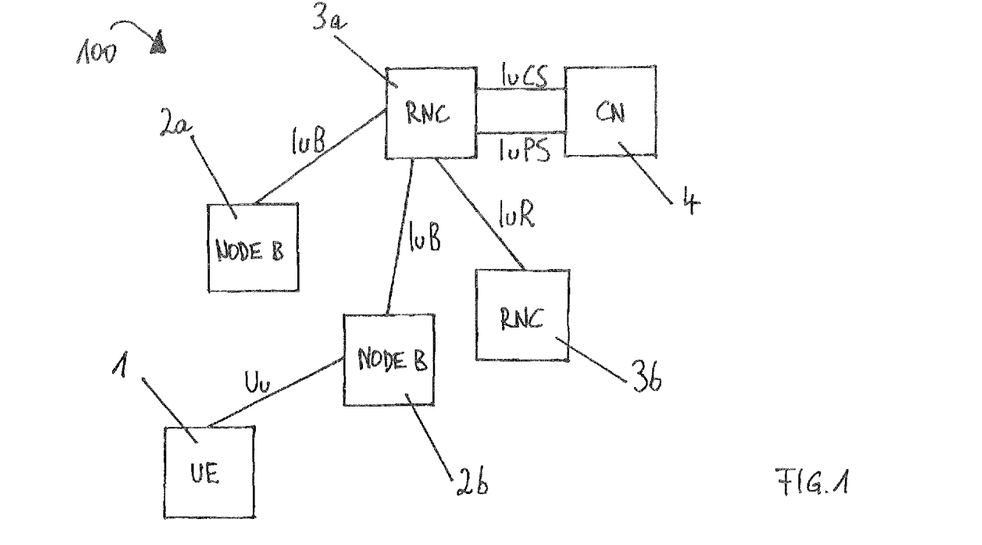
FIG. 1 schematically illustrates a radio communications system 100.

FIG. 1 schematically illustrates an exemplary radio communications system 100 including a UE 1, a first Node B 2a and a second Node 2b, Radio Network Controllers (RNC) 3a and 3b, as well as a Core Network (CN) 4. The RNCs 3a and 3b may provide various control functionalities for the Node Bs 2a and 2b while the CN 4 may be configured to provide various services to a connected UE 1. Interfaces between the illustrated components are labeled as IuB, IuCS, IuPS, IuR and Uu.

When the UE 1 is booted or moved between different radio cells, a communication path has to be established between the UE 1 and the CN 4. Once a communication path is selected, the UE 1 needs to establish a Radio Resource Control (RRC) connection to the CN 4. In UMTS, a corresponding RRC protocol belongs to the UMTS WCDMA protocol stack and handles a control plane signaling of Layer 3 between the UE 1 and the CN 4. For example, the RRC protocol may include the following functions: broadcast of system information, broadcast of neighboring cell information, paging, establishment/modification/release of RRC connections, establishment/modification/release of point to point radio bearers carrying user data, etc.

After an RRC connection has been established, a transmission of further data between components of the radio communications system 100 may occur. Generally, a data transmission and an associated schedule for the data transmission may be based on radio bearers (RB). RBs may include data radio bearers (DRB) and signaling radio bearers (SRB). A DRB may be used for a transmission of speech data which may be encoded according to a speech codec or audio codec based on an arbitrary audio data compression scheme, for example an Adaptive Multi-Rate (AMR) audio codec. A DRB may also be used for a transmission of data which is scheduled for a package-oriented data transmission. Examples for such data are: e-mail data, data processed and/or output by a web browser, Internet download data, video-telephony data, Multi Messaging Service (MMS) data, etc. In practice, DRB data may be transmitted over one or more transport channels (TrCH). For example, three TrCHs may be setup if an AMR speech call is established.

Signaling radio bearers (SRB) may be defined as RBs carrying radio resource control plane data. They may be used for a transmission of RRC messages and/or Non-Access Stratum (NAS) messages. In UMTS, five SRBs may be specified: SRB0, SRB1, SRB2, SRB3 and SRB4. Here, SRB0 may be used for messages sent on a Common Control Channel (CCCH) wherein Radio Link Control (RLC) Transparent Mode (TM) for the Uplink (UL) and RLC Unacknowledged Mode (UM) for the Downlink (DL) may be employed. SRB1 may be used for messages sent on a Dedicated Control Channel (DCCH) when using RLC-UM. SRB2 may be used for messages sent on the DCCH when using RLC-AM, except for RRC messages carrying higher layer (NAS) signaling. SRB3 and optionally SRB4 may be used for RRC messages carrying higher layer (NAS) signaling and sent on the DCCH in RLC-AM. In practice, the SRBs may be mapped and multiplexed to one or more TrCHs.

The above mentioned term "Acknowledged Mode" specifies that, if data for a respective SRB is transmitted between the UE 1 and the CN 4, a confirmation (i.e. an acknowledgment) is sent from the receiving device to the transmitting device in order to indicate that data has been successfully received. If a data transmission is not confirmed, lost data may be resent. In contrast, the term "Unacknowledged Mode" indicates that no acknowledgment data is intended to be sent. It is noted that more information on SRBs and their usage is included in the above mentioned 3GPP documents.

A data transmission using SRBs may be scheduled on a Medium Access Control (MAC) layer. For this purpose, the UE 1 may include a MAC unit which is configured to perform operations on a MAC layer level. The MAC layer is a sub-layer of the Data Link Layer specified in the seven layer Open Systems Interconnection (OSI) model. The MAC unit may, inter alfa, provide addressing and channel access control mechanisms to support a communication between components of the radio communications system 100. Note that the MAC unit may include both, hardware and software components. For example, it may include or correspond to a software running on a digital signal processor (DSP).

The MAC unit may perform a Transport Format Combination Indicator (TFCI) selection procedure including decisions on transport formats of employed TrCHs and/or an amount of bits transmitted via the TrCHs. The decisions may be made for a current and/or forthcoming transmission time intervals (TTI). Here, the term "TTI" may refer to a parameter, e.g. of UMTS, which is related to an encapsulation of data from higher layers of the layer model into frames for a transmission on the radio link layer. The TFCI procedure may take into account the amount of data bits on the different TrCHs, a logical channel priority of RBs mapped to those TrCHs as well as an estimated transmission power for a scheduled Uplink transmission.

If the CN 4, for example due to Cyclic Redundancy Check (CRC) errors, does not correctly receive protocol data units (PDU) transmitted via a transmission channel for an SRB using AM mode, the CN 4 may stop or interrupt a data transmission via a Dedicated Channel (DCH). For example, a speech call may be dropped according to retransmission attempt rules which may be defined according to the 3GPP standard (see above mentioned 3GPP documents). Here, the risk of CRC errors increases with an increasing amount of bits to be transmitted. In a similar way, the CN 4 may stop or interrupt a data transmission via a DCH if the ON 4 does not receive acknowledgements for PDUs that were sent to the UE 1. In order to maintain a stable DCH connection between the UE 1 and the CN 4, it may thus be important to provide a stable and correct data transmission via a TrCH which is based on one or more SRBs. Note that the drop of, e.g., a speech call may particularly occur when the UE 1 enters a weak coverage area and thus needs to send with a very high (or even maximum) transmission power. In this case, a drop of a speech call may even occur if a TFCI is chosen according to which a minimum amount of data is transmitted on the speech TrCH and the SRB TrCH, respectively.

FIGS. 2 to 7 schematically illustrate various transmitter circuits as exemplary embodiments. It is understood that the shown transmitter circuits may include further components that are not illustrated for the sake of simplicity. For example, the transmitter circuits may include one or more input and output ports for receiving and outputting signals, down conversion units to down-convert analog signals lying in a radio frequency range into an intermediate frequency band or into the baseband, up conversion units for a conversion vice versa, Analog-to-Digital Converters (ADC), and Digital-to-Analog Converters (DAC). The transmitter circuits may further include amplifiers, analog filters, digital filters, etc. Note that each of the transmitter circuits may also be configured to operate as a receiver circuit.

In FIGS. 2 to 7 (electrical) connections between illustrated components are shown. It is understood that the transmitter circuits may include further connections which are not illustrated for the sake of simplicity. Note further that FIGS. 2 to 7 are of qualitative character. For example, an illustration of components in block form does not necessarily imply that the components are physically and/or functionally separated from each other. Rather, it is also possible that a component may include or be a part of another component.

Figure 2:
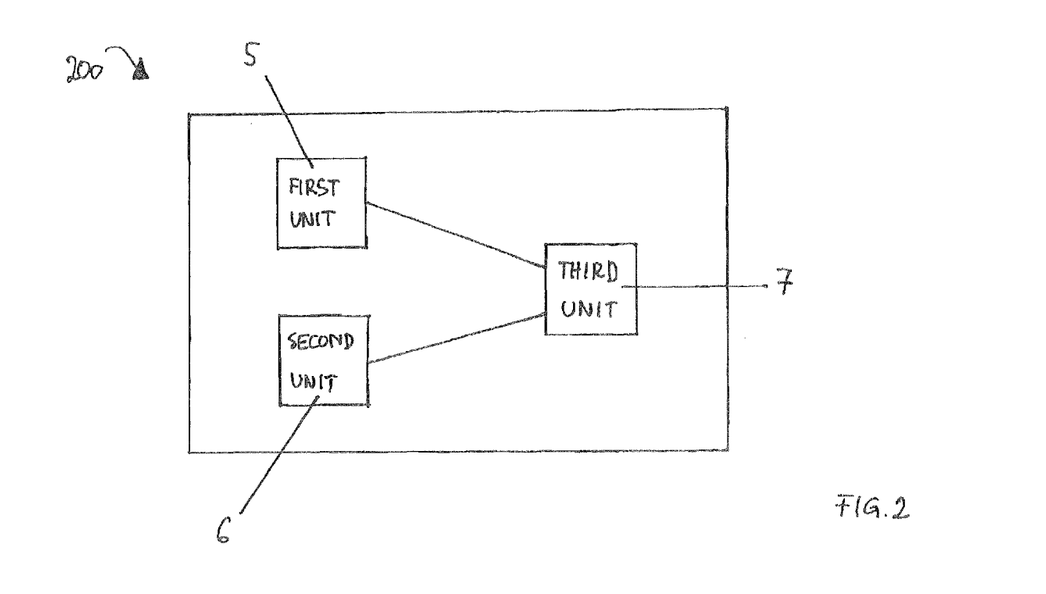
FIG. 2 schematically illustrates a transmitter circuit 200 as an exemplary embodiment.

FIG. 2 schematically illustrates a transmitter circuit 200 including a first unit 5, a second unit 6 and a third unit 7. The first unit 5 is configured to determine a transmission power and may employ arbitrary components and methods for this purpose. In order to determine a transmission power of the transmitter circuit 200, the first unit 5 may be connected to an antenna port which may be connected to a transmission antenna. The second unit 6 is configured to determine whether a transmission of data for an SRB is scheduled or not. For example, the second unit 6 may include or may be a part of a MAC unit. Since a schedule and a configuration of an SRB and a data transmission associated with the SRB may be based on the MAC layer, the MAC unit may inherently access information required to determine whether a transmission of data for an SRB is scheduled or not.

The third unit 7 is configured to suppress or stop a transmission of transmission data if the transmission power reaches or exceeds a threshold value and if a transmission of data for one or more SRBs is scheduled. For example, the threshold value may be chosen as the maximum transmission power of the transmitter circuit 200 wherein exemplary values for a maximum transmission power are 18 dBm and 24 dBm. Alternatively, the threshold value may have a value of about 95 percent or more of the maximum transmission power. In order to receive information on the transmission power and the SRB schedule, the third unit 7 is coupled to the first unit 5 and the second unit 6. For example, the third unit 7 may be a control unit which is configured to suppress a transfer of non-SRB data between components of the transmitter circuit 200. This way, it is possible to avoid transmission data to be output by the transmission circuit 200 such that an actual transmission of data over an air interface may be avoided. Alternatively, the third unit 7 may include or be a part of a MAC unit which is configured to suppress a transmission of transmission data by simply not scheduling a user data transmission.

The transmitter circuit 200 may be configured to output data based on both, DRBs and SRBs. As mentioned before, it may be important to provide a stable and correct data transmission based on the SRBs. By suppressing a transmission of transmission user data if the transmission power reaches or exceeds a threshold value and if a transmission of data for the signaling radio bearer is scheduled, the amount of transmission data output by the transmitter circuit 200 (and thus the amount of data transmitted over an antenna) may be reduced. This way, the total number of CRC errors may be reduced such that a data transmission based on the SRBs may be stabilized. Note that, in principle, the suppressed transmission data may be any kind of negligible data except the data for the SRB. In particular, the suppressed transmission data may be data scheduled for a transmission over a DRB, data scheduled for a package-oriented data transmission and/or speech data. It may particularly be important to stabilize a transmission based on the SRBs using RLC-AM (e.g. SRB2 and SRB3/4) because an erroneous transmission of associated data and/or acknowledgment of received data may result in an interruption of a data transmission via a DCH (see above).

The transmission of transmission user data may be suppressed for a time interval for which the transmission of data for the SRBs is scheduled. For example, a transmission time interval (TTI) associated with an SRB transmission may have a length of 40 ms (milliseconds) such that transmission data may be suppressed for this specific time period. For the case of transmitted speech data, a suppression for (exactly) this time interval may hardly be recognized by a receiving component due to the robustness of an employed speech codec or audio codec.

The transmission of transmission data may also be suppressed for less than or equal to five TTIs. If Layer 3 (L3) messages are scheduled for a transmission based on an SRB, the messages may not fit into only one TTI such that multiple TTIs may be required to transmit the complete data of the L3 message. In this case, the time for suppressing the transmission data may be added to the sum of combined TTIs in order to send out the complete data. Under static or pedestrian conditions, L3 messages are usually not scheduled very often such that an impact of suppressed transmission data (e.g. speech data) should not be recognized by a receiving component.

The transmitter circuit 200 may be configured to operate in a first mode to suppress a transmission of transmission data and in a second mode in which the transmission of transmission data is not suppressed. The first mode may be activated by setting a flag to a predetermined value. Thus, it may be possible for a manufacturer of a UE including the transmitter circuit 200 to choose if the above described operations of the transmitter circuit 200 are applied or not. For example, the flag may be set by the manufacturer before the transmitter circuit 200 is included in the UE. The flag may be read out of a memory during an initialization (or a booting sequence) of the UE.

Figure 3:
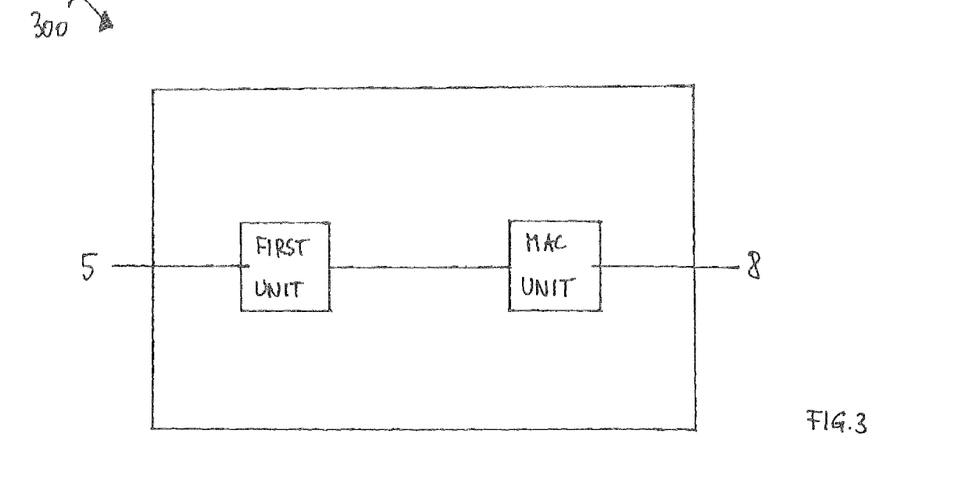
FIG. 3 schematically illustrates a transmitter circuit 300 as a further exemplary embodiment.

FIG. 3 schematically illustrates a transmitter circuit 300 including a first unit 5 connected to a MAC unit 8. The first unit 5 is configured to determine a transmission power and may correspond to the first unit 5 of FIG. 2. The MAC unit 8 is configured to determine whether a transmission of data for an SRB is scheduled or not. In addition, the MAC unit 8 is configured to suppress a transmission of data scheduled for a transmission over a DRB if the transmission power reaches or exceeds a threshold value and if a transmission of data for the SRB is scheduled. Hence, the MAC unit 8 of FIG. 3 performs similar operational steps as the second unit 6 and the third unit 7 of FIG. 2. It is thus understood that comments made in connection with the properties of the transmitter circuit 200 may also hold true for the transmitter circuit 300.

Figure 4:
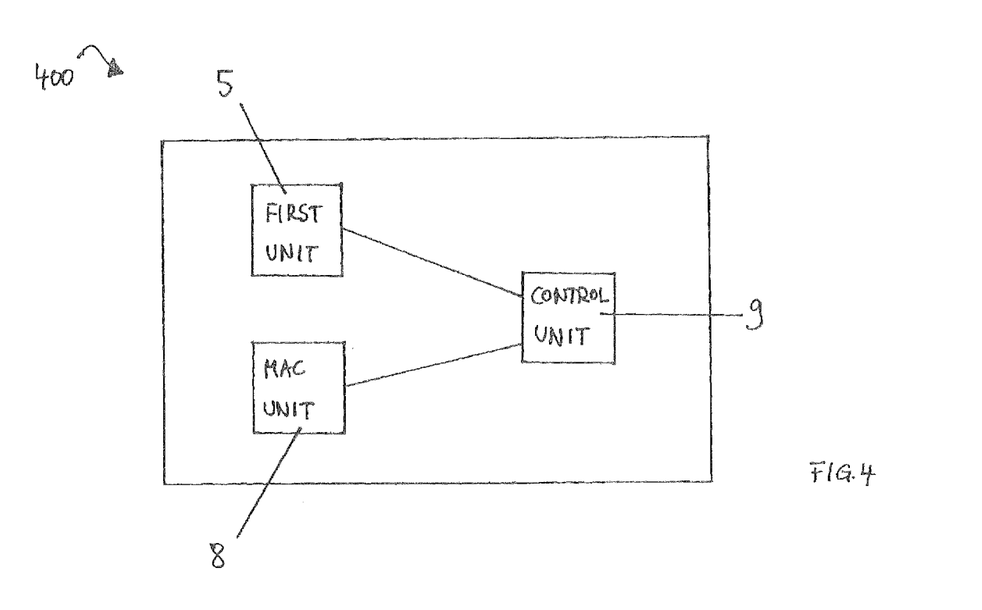
FIG. 4 schematically illustrates a transmitter circuit 400 as a further exemplary embodiment.

FIG. 4 schematically illustrates a transmitter circuit 400 including a first unit 5, a MAC unit 8 and a control unit 9. The control unit 9 is connected to each of the first unit 5 and the MAC unit 8 in order to exchange data with these components. The first unit 5 is configured to determine a transmission power and may correspond to similar components shown in previous figures. The MAC unit 8 is configured to determine whether a transmission of data for an SRB is scheduled or not. The control unit 9 is configured to suppress a data transmission between a microphone port (not shown) and a component of the transmitter circuit 400 if the transmission power reaches or exceeds a threshold value and if a transmission of data for the SRB is scheduled.

By suppressing a data transmission between the microphone port and a component of the transmitter circuit 400 it is possible to reduce the amount of data output by the transmitter circuit 400 such that a transmission of data associated with SRBs may be stabilized as it has already been mentioned in foregoing paragraphs. Comparing FIGS. 2 and 4, the second unit 6 of FIG. 2 may be identified with the MAC unit 8 of FIG. 4 while the third unit 7 of FIG. 2 may be identified with the control unit 9 of FIG. 4. Accordingly, comments made in connection with the properties of the transmitter circuit 200 may also hold true for the transmitter circuit 400.

Figure 5:
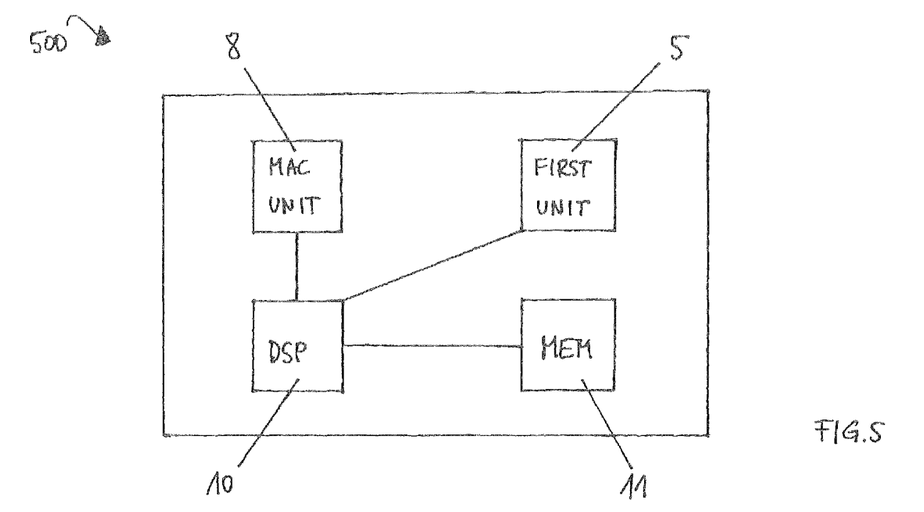
FIG. 5 schematically illustrates a transmitter circuit 500 as a further exemplary embodiment.

FIG. 5 schematically illustrates a transmitter circuit 500 including a first unit 5, a MAC unit 8, a DSP 10 and a memory 11. During an operation of the transmitter circuit 500, the DSP 10 may process data scheduled for a transmission between the transmitter circuit 500 and further components of a radio communications system. For example, the DSP 10 may be configured to encode data according to a speech codec or audio codec, for example an Adaptive Multi-Rate (AMR) audio codec. In addition, the DSP 10 may be configured to process data scheduled for a package-oriented data transmission, like e-mail data, data processed and/or output by a web browser, data downloaded from the Internet, video-telephony data, Multi Messaging Service (MMS) data, etc. The processed data may be forwarded to a memory 11 where it may be stored and optionally be forwarded to further components of the transmitter circuit 500 for further processing. Finally, the processed data may be output by the transmitter circuit 500 and transmitted by means of an antenna.

Similar to the transmitter circuits described in the foregoing paragraphs, the first unit 5 may determine a transmission power of the transmitter circuit 500 and the MAC unit 8 may determine whether a transmission of data for an SRB is scheduled. If the transmission power reaches or exceeds a threshold value and if a transmission of data for the SRB is scheduled, the MAC unit 8 may signalize to the DSP 10 that a transmission of data scheduled for a transmission over a DRB shall be suppressed in order to stabilize a data transmission based on the SRB. The DSP 10 may then provide a control signal in order to effect that data processed by the DSP 10 and stored in the memory 11 is not read out from the memory 11 and not forwarded to further components of the transmitter circuit 500. This way, the stored data is not further processed and not output by the transmitter circuit 500. For example, the control signal provided by the DSP 10 may control the memory 11 and/or any component of the transmitter circuit 500 configured to read out data from the memory 11 and/or process data output by the memory 11.

Figure 6:
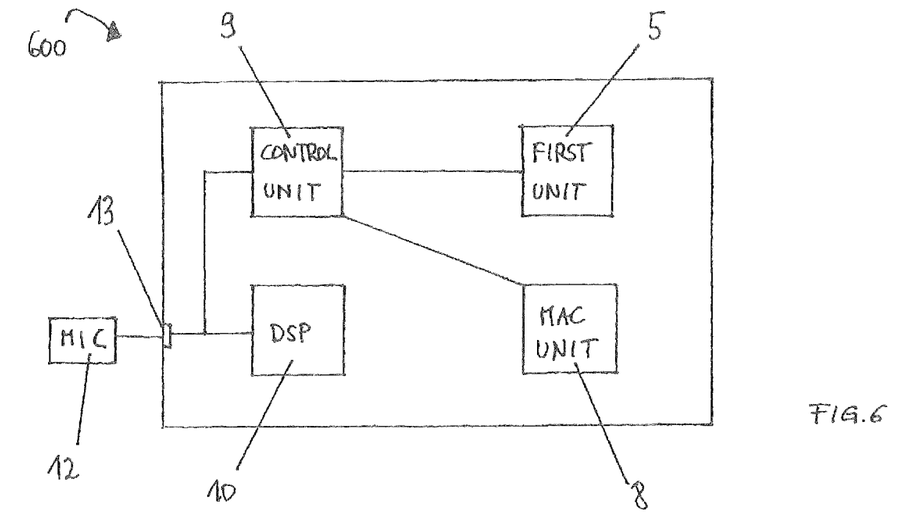
FIG. 6 schematically illustrates a transmitter circuit 600 as a further exemplary embodiment.

FIG. 6 schematically illustrates a transmitter circuit 600 including a first unit 5, a MAC unit 8, a control unit 9, a DSP 10 and a microphone port 13. In addition, a microphone 12 is illustrated which may be a part of the transmitter circuit 600 or may be an external component. The first unit 5, the MAC unit 8 and the DSP 10 may correspond to similar components described in connection with previous figures. The control unit 9 is configured to suppress a data transmission between the microphone port 13 and the DSP 10 and/or between the microphone port 13 and further components of the transmitter circuit 600.

During a speech call, the microphone port 13 receives speech data spoken into the microphone 12. The speech data may be forwarded to the DSP 10 where it may be encoded according to an audio codec or a speech codec. Note that the transmitter circuit 600 may include a unit arranged between the microphone port 13 and the DSP 10 and configured to convert analogue speech data into the digital domain. The control unit 9 is connected to the first unit 5 and the MAC unit 8 to receive information about the transmission power and the schedule of SRB transmissions, respectively. If the transmission power reaches or exceeds a threshold value and if a transmission of data for one or more SRBs is scheduled, the control unit 9 suppresses a data transmission between the microphone port 13 and the DSP 10 and/or between the microphone port 13 and further components of the transmitter circuit 600 which are connected to the microphone port 13. As a result, no speech data is processed by the DSP 10 and/or further components and thus not output by the transmitter circuit 600 such that a data transmission scheduled for the SRB may be stabilized.

Figure 7:
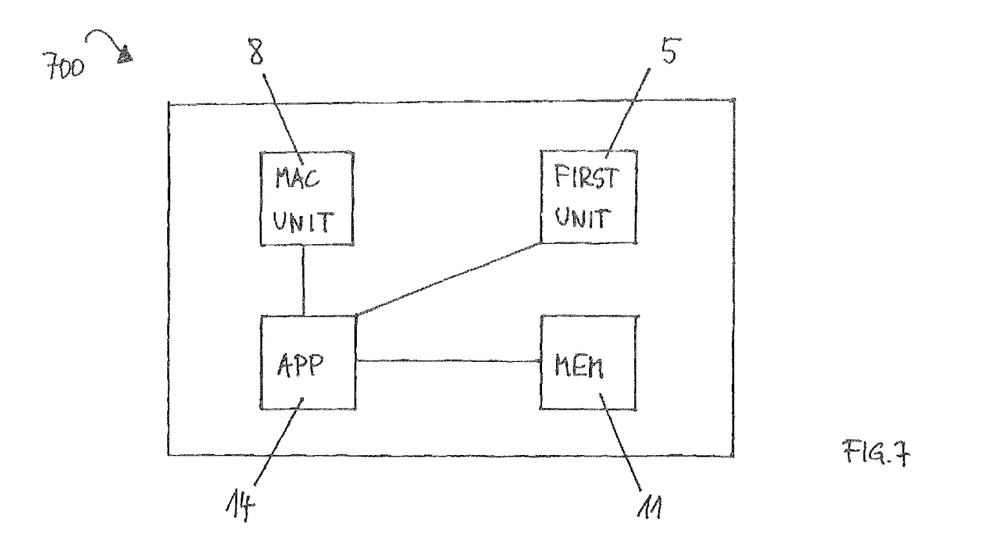
FIG. 7 schematically illustrates a transmitter circuit 700 as a further exemplary embodiment.

FIG. 7 schematically illustrates a transmitter circuit 700 including a first unit 5, a MAC unit 8, a memory 11 and an application unit 14. The transmitter circuit 700 may be similar to the transmitter circuit 500 wherein the DSP 10 of FIG. 5 has been replaced by the application unit 14. The application unit 14 is configured to perform an application producing data which may be scheduled for a transmission, in particular over a DRB. Note that examples for applications performed by the application unit 14 have already been described in foregoing paragraphs (e-mail data, etc.). If the transmission power reaches or exceeds a threshold value and if a transmission of data for the SRB is scheduled, control signals may be provided to effect that data output by the application unit 14 and stored in the memory 11 is not read out of the memory 11 and not forwarded to further components of the transmitter circuit 700. This way, the stored data is not further processed and not output by the transmitter circuit 700. For example, the control signals may be provided by the application unit 14 or a further component of the transmitter circuit 700, for example a DSP.

As already stated above, the transmitter circuits of FIGS. 2 to 7 may provide a stabilization of data transmissions based on SRBs. Note that a stabilization may also be provided by various other ways which may be combined with an operation of the described transmitter circuits. For example, rules may be defined for blocking certain TFCI decisions on the basis of a transmission power estimation. Here, for each TTI, a UE or a transmitter circuit may calculate a number of bits which may be transmitted with a high probability of being correctly received (path loss estimations). If the transmission power becomes too high and reaches or exceeds a certain threshold value, one or more TFCIs containing the highest total numbers of bits may first be labeled to exceed a certain transmission power ("excess power state") and may later be blocked for the TFCI selection. In addition or alternatively, one or more (minimum) sets of TFCIs may be defined that are not allowed to be blocked under any circumstances. The sets may include TFCIs sending only one PDU for AM radio bearers or TFCIs sending a minimum transparent mode rate (i.e. a lowest configured AMR rate). Thus, in high power conditions, a successful reception of data on a receiving side may be provided by blocking such TFCIs having a high number of bits.

Figure 8:
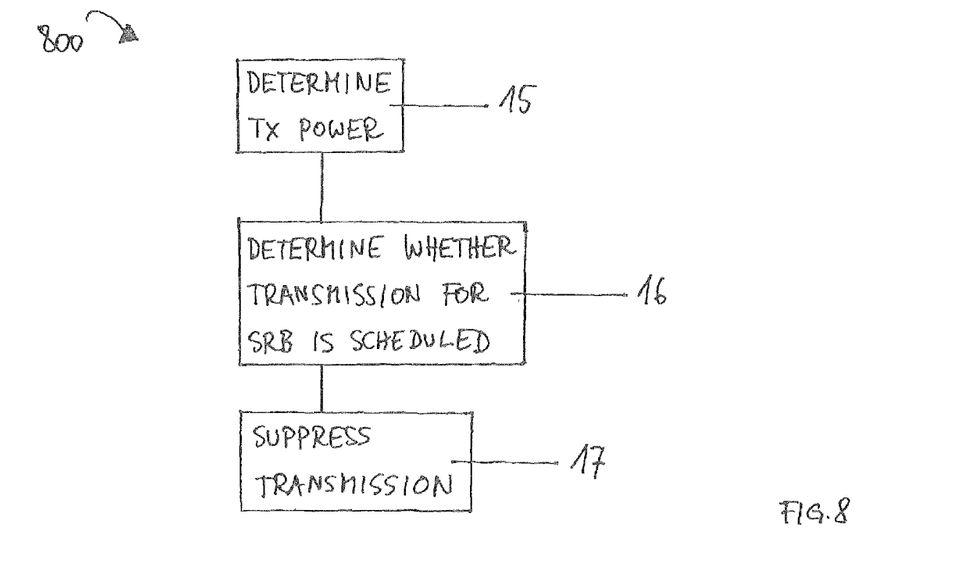
FIG. 8 is a flow chart that illustrates a method 800 as an exemplary embodiment.

FIG. 8 schematically illustrates a method 800 as an exemplary embodiment. The flow chart of FIG. 8 may be read in connection with the transmitter circuit 200 of FIG. 2 in one embodiment, but is not so limited. In a first method step 15, a transmission (TX) power is determined (see first unit 5 of FIG. 2). In a second method step 16, it is determined whether a transmission of data for an SRB is scheduled (see second unit 6 in FIG. 2). Note that FIG. 8 does not necessarily imply that method step 16 is performed after method step 15. Rather, it is also possible that method step 15 is performed after method step 16 or at least parts of both method steps 15 and 16 are performed at the same time. In a third method step 17, a transmission of transmission user data is suppressed if the transmission power reaches or exceeds a threshold value and if a transmission of data for an SRB is scheduled (see third unit 7 of FIG. 2).

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A transmitter circuit configured to transmit control data on a signaling radio bearer and user data on a data radio bearer, comprising:
    a first unit configured to determine a transmission power;
    a second unit configured to determine whether a transmission of control data for the signaling radio bearer is scheduled; and
    a third unit configured to suppress a transmission of user data for the data radio bearer of the transmitter circuit if the transmission power exceeds a threshold value and if a transmission of control data for the signaling radio bearer is scheduled,
    wherein the transmission of the user data is suppressed during a time interval for which the transmission of control data is scheduled, and
    wherein the threshold value is 95 percent or more of a maximum transmission power.

2. The transmitter circuit of claim 1, wherein the signaling radio bearer uses a Radio Link Control (RLC) acknowledged mode.

3. The transmitter circuit of claim 1, wherein the transmission data comprises data which is scheduled for a transmission over a data radio bearer.

4. The transmitter circuit of claim 1, wherein the transmission data comprises data which is scheduled for a package-oriented data transmission.

5. The transmitter circuit of claim 1, wherein the transmission data comprises speech data.

6. The transmitter circuit of claim 1, wherein the threshold value substantially corresponds to a maximum transmission power.

7. The transmitter circuit of claim 1, wherein the transmission of transmission data is suppressed for a time interval for which the transmission of data for the signaling radio bearer is scheduled.

8. The transmitter circuit of claim 1, wherein the transmission of transmission data is suppressed for less than or equal to five transmission time intervals (TTI).

9. The transmitter circuit of claim 1, wherein the transmitter circuit is configured to operate in a first mode and in a second mode, the transmission of transmission data being suppressed in the first mode, and wherein the first mode is activated if a flag is set to a predetermined value.

10. A transmitter circuit configured to transmit control data on a signaling radio bearer and user data on a data radio bearer, comprising:
    a first unit configured to determine a transmission power;
    a second unit configured to determine whether a transmission of control data for the signaling radio bearer is scheduled;
    a third unit configured to suppress a transmission of user data for the data radio bearer of the transmitter circuit if the transmission power exceeds a threshold value and if a transmission of control data for the signaling radio bearer is scheduled,
    wherein the transmission of the user data is suppressed during a time interval for which the transmission of control data is scheduled; and
    a control unit configured to:
        suppress a data transmission between a microphone port and a component of the transmitter circuit; or
        suppress a data transmission between a memory and a component of the transmitter circuit.

11. The transmitter circuit of claim 1, further comprising:
    a digital signal processor configured to encode data according to an audio codec or a speech codec or to process data scheduled for a package-oriented data transmission.

12. The transmitter circuit of claim 1, further comprising:
    a memory configured to store speech data or data scheduled for a package-oriented data transmission.

13. The transmitter circuit of claim 1, wherein the second unit comprises a Medium Access Control (MAC) unit.

14. The transmitter circuit of claim 1, wherein the third unit comprises a Medium Access Control (MAC) unit.

15. The transmitter circuit of claim 1, further comprising:
    a Medium Access Control (MAC) unit configured to determine whether a transmission of control data for the signaling radio bearer is scheduled and configured to suppress a transmission of user data scheduled for a transmission over the data radio bearer if the transmission power exceeds a threshold value and if a transmission of control data for the signaling radio bearer is scheduled, wherein the transmission of user data is suppressed during a time interval for which the transmission of control data is scheduled.

16. A method, comprising:
    determining a transmission power of a transmitter circuit, wherein the transmitter circuit is configured to transmit control data on a signaling radio bearer and user data on a separate data radio bearer;
    determining whether a transmission of data for the signaling radio bearer is scheduled; and
    suppressing a transmission of control data over the data radio bearer by the transmitter circuit if the transmission power of the transmitter circuit exceeds a threshold value and if a transmission of control data for the signaling radio bearer is scheduled by the transmitter circuit,
    wherein the transmission of user data is suppressed during a time interval for which the transmission of control data is scheduled, and
    wherein the threshold value is 95 percent or more of a maximum transmission power.

17. The method of claim 16, wherein the signaling radio bearer uses a Radio Link Control (RLC) acknowledged mode.

18. The method of claim 16, wherein the transmission of the transmission data is suppressed for a time interval for which the transmission of data for the signaling radio bearer is scheduled.

19. A method, comprising:
    determining a transmission power of a transmitter circuit, wherein the transmitter circuit is configured to transmit control data on a signaling radio bearer and user data on a separate data radio bearer;
    determining whether a transmission of data for the signaling radio bearer is scheduled;

suppressing a transmission of control data over the data radio bearer by the transmitter circuit if the transmission power of the transmitter circuit exceeds a threshold value and if a transmission of control data for the signaling radio bearer is scheduled by the transmitter circuit, wherein the transmission of user data is suppressed during a time interval for which the transmission of control data is scheduled; and suppressing:
- a data transmission between a microphone port and a component of the transmitter circuit, or
- a data transmission between a memory and a component of the transmitter circuit.

* * * * *